United States Patent
Snyder, II et al.

(10) Patent No.: US 9,838,471 B2
(45) Date of Patent: Dec. 5, 2017

(54) METHOD AND AN APPARATUS FOR WORK REQUEST ARBITRATION IN A NETWORK PROCESSOR

(71) Applicant: Cavium, Inc., San Jose, CA (US)

(72) Inventors: Wilson Parkhurst Snyder, II, Holliston, MA (US); Richard Eugene Kessler, Northboroug, MS (US); Daniel Edward Dever, North Brookfield, MA (US); Nitin Dhiroobhai Godiwala, Boylston, MA (US); David Kravitz, Cambridge, MA (US)

(73) Assignee: Cavium, Inc., San Jose, CA (US)

( * ) Notice: Subject to any disclaimer, the term of this patent is extended or adjusted under 35 U.S.C. 154(b) by 421 days.

(21) Appl. No.: 14/171,108

(22) Filed: Feb. 3, 2014

(65) Prior Publication Data
US 2015/0222698 A1   Aug. 6, 2015

(51) Int. Cl.
G06F 9/46 (2006.01)
H04L 29/08 (2006.01)
G06F 9/50 (2006.01)

(52) U.S. Cl.
CPC .......... H04L 67/1008 (2013.01); G06F 9/505 (2013.01)

(58) Field of Classification Search
CPC .............................. G06F 9/505; H04L 67/1008
See application file for complete search history.

(56) References Cited

U.S. PATENT DOCUMENTS

| | | | |
|---|---|---|---|
| 7,895,431 B2 | 2/2011 | Bouchard et al. | |
| 7,975,269 B2 * | 7/2011 | Bates | G06F 9/4881 718/100 |
| 2008/0052712 A1 * | 2/2008 | Gustafson | G06F 9/505 718/101 |
| 2011/0055839 A1 * | 3/2011 | Alexander | G06F 9/5066 718/102 |
| 2013/0111000 A1 | 5/2013 | Kravitz et al. | |
| 2014/0173112 A1 * | 6/2014 | Seago | H04L 67/32 709/226 |

* cited by examiner

*Primary Examiner* — Camquy Truong
(74) *Attorney, Agent, or Firm* — pkalousek.ip (57) ABSTRACT

A method and a system embodying the method for work request arbitration, comprising receiving a work request, the work request indicating one or more groups from a plurality of groups; determining at least one of a plurality of parameters in accordance with the received work request; determining eligibility to provide work among the one or more groups that have work in a work queue in accordance with a first set of the plurality of parameters; and selecting one of the determined eligible groups to provide the work in accordance with a second set of the plurality of parameters is disclosed.

22 Claims, 4 Drawing Sheets

METHOD AND AN APPARATUS FOR WORK REQUEST ARBITRATION IN A NETWORK PROCESSOR

BACKGROUND

1. Field

The present disclosure relates to network processor. More particularly, this invention is directed toward arbitrating work request from a plurality of requestors in a network processor.

2. Description of Related Technology

A network processor is specialized processor, often implemented in a form of an integrated circuit, with a feature set specifically designed for processing packet data received or transferred over a network. Such packet data is transferred using a protocol designed, e.g., in accordance with an Open System Interconnection (OSI) reference model. The OSI defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, e.g., by file transfer, electronic mail, and other communication known to a person of ordinary skills in the art.

The network processor may schedule and queue work, i.e., packet processing operations, for upper level network protocols, for example L4-L7, and being specialized for computing intensive tasks, e.g., computing a checksum over an entire payload in the packet, managing TCP segment buffers, and maintain multiple timers at all times on a per connection basis, allows processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate. An example of such processor may be found in U.S. Pat. No. 7,895,431.

To improve network processor efficiency, multiple cores are scheduled to carry the processing via a scheduling module. The scheduling module divides the work to be scheduled into a plurality of (ideally) parallel streams, called groups. However, having a large number of such groups means there may be a large number of parallel requests for work from the multiple cores, which need to be arbitrated. Arbitration is a process of selecting work from the plurality of groups to be returned to the requestor. Arbitration solutions known in the art are either expensive in area required on the network processor chip, expensive in time it takes to process the request, or do not allow for different weighting or selecting what groups participate in the arbitration.

Accordingly, there is a need in the art for method and an apparatus providing a solution to the above identified problems, as well as additional advantages.

SUMMARY

In an aspect of the disclosure, a method and an apparatus implementing the method for work request arbitration according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1:
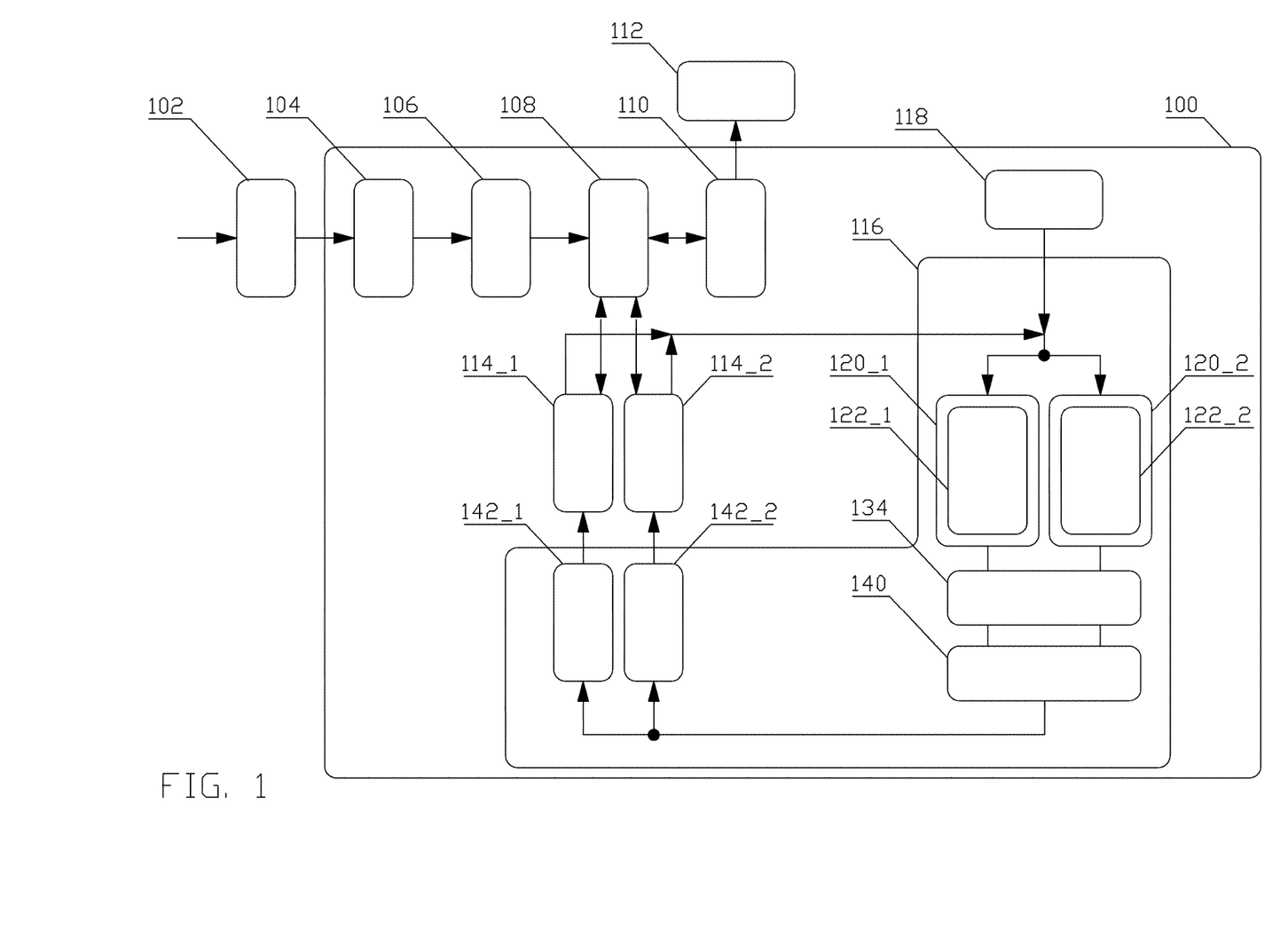
FIG. 1 depicts a conceptual structure of a network processor in accordance with an aspect of this disclosure.
Figure 2:
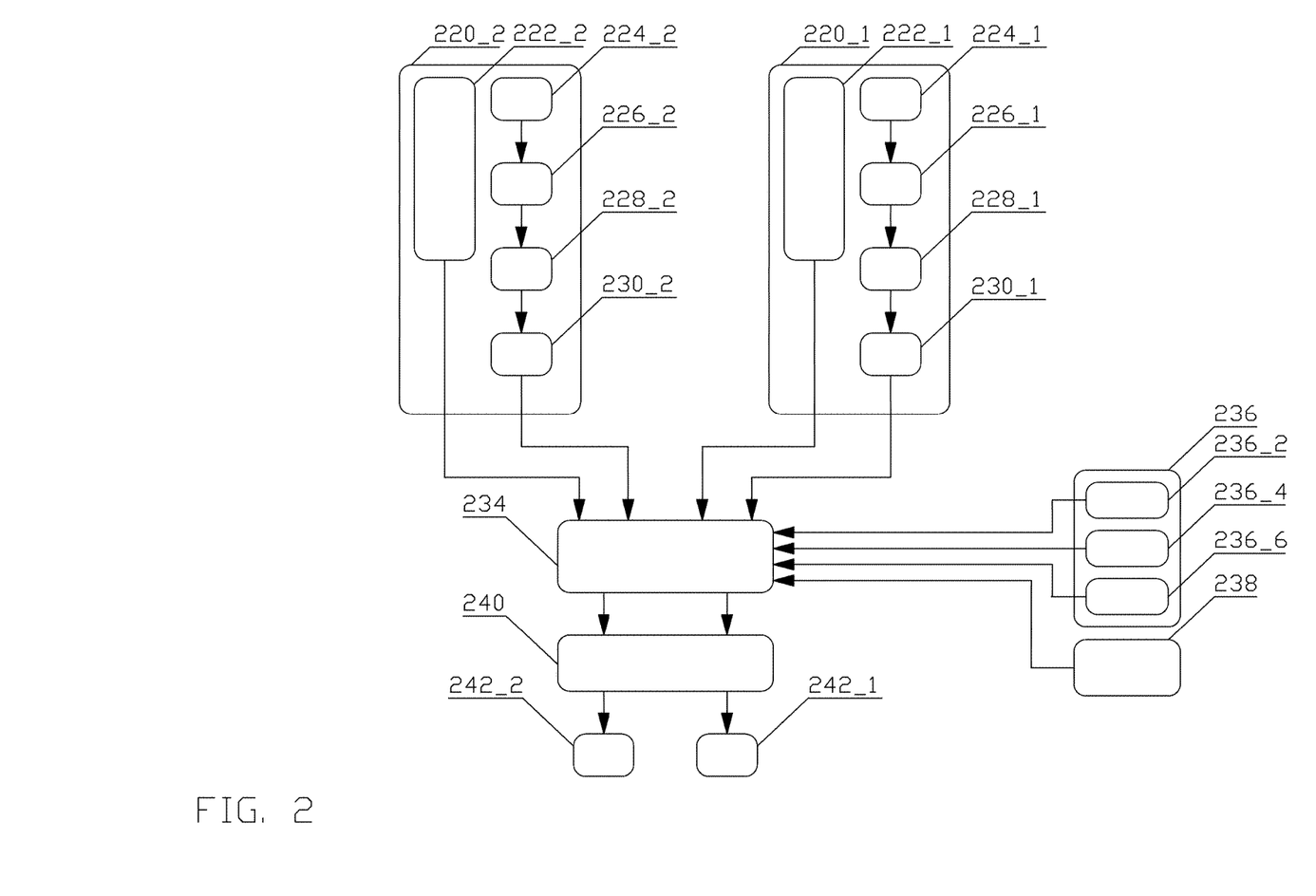
FIG. 2 depicts a conceptual structure of a group in accordance with an aspect of this disclosure.

The description of like structural elements among the figures, is not repeated; the like elements have reference numerals differing by an integer multiple of 100, i.e., reference numeral 102 in FIG. 1a, 1b, becomes reference numeral 202 in FIG. 2; unless differences and/or alternative aspects are explicitly noted. An expression "_X" in a reference indicates an instance of an element of a drawing where helpful for better understanding. Any unreferenced arrow or double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

FIG. 1 depicts a conceptual structure of a network processor 100. A packet is received over a network (not shown) at a physical interface unit 102. The physical interface unit 102 provides the packet to a network processor interface 104.

The network processor interface 104 carries out L2 network protocol pre-processing of the received packet by checking various fields in the L2 network protocol header included in the received packet. After the network processor interface 104 has performed L2 network protocol processing, the packet is forwarded to a packet input unit 106.

The packet input unit 106 performs pre-processing of L3 and L4 network protocol headers included in the received packet, e.g., checksum checks for Transmission Control Protocol (TCP)/User Datagram Protocol (UDP). The packet input unit 106 writes packet data into a level L2 cache 108 and/or a memory 112. A cache is a component, implemented as a block of memory for temporary storage of data likely to be used again, so that future requests for that data can be served faster. If requested data is contained in the cache (cache hit), this request can be served by simply reading the cache, which is comparatively faster. Otherwise (cache miss), the data has to be recomputed or fetched from its original storage location, which is comparatively slower. The memory 112 may comprise any physical device(s) used to store instructions and/or data on a temporary or permanent basis. Any type of memory known to a person skilled in the art is contemplated. In an aspect, the memory 112 is external to the network processor 100 and is accessed via a memory controller 110. The packet input unit 106 supports a programmable buffer size and can distribute packet data across multiple buffers to support large packet sizes.

Any additional work, i.e., another operation of additional packet processing, required on the packet data is carried out by a software entity executing on one or more processor cores 114. Although only two processor cores 114_1, 114_2 are shown, a person of ordinary skills in the art will understand that other number, including a single core is contemplated. Each of the one or more processor cores 114 is communicatively coupled to the L2 cache 108.

Work is scheduled by a Schedule, Synchronize, and Order (SSO) unit 116. Generally, work is a software routine or handler to be performed on some data. With regards to the SSO unit 116, work is a pointer to memory, where that memory contains a specific layout. In an aspect, the memory comprises the cache 108 and/or the memory 112. In an aspect, the layout comprises a work-queue entry storing the data and/or the instructions to be processed by the software entity execution on one or more of the processor cores 114, initially created by the packet input unit 106 or the software entity executing on each processor core 114. In an aspect, the work-queue entry may further comprise metadata for the work. In another aspect, the metadata may be stored in a work queue 122. In an aspect, the metadata may comprise a group-indicator, a tag, and a tag-type.

A person skilled in the art will appreciate that the SSO unit 116 comprises additional hardware units in addition to the hardware units explicitly depicted and described in FIG. 1 and associated text. Thus, reference to a step or an action carried out by the SSO unit 116 is carried out by one of such additional hardware units depending on a specific implementation of the SSO unit 116.

A group 120 comprises a collection of one of more work queues 122. Although only two groups are depicted, a person of ordinary skills in the art will understand that other number of groups is contemplated. Each group 121 is associated with at least one processor core 114. Consequently, when a software entity executing on the processor core 114 or the processor core 114 itself requests work, the arbitration does not need to be made for the groups 121 not associated with the processor core 114, improving performance. Although both the software entity and the processor core may be the requestor, in order to avoid unnecessary repetitiveness, in the reminder of the disclosure only the software entity is recited.

Because the number of the work queues is irrelevant for the subject-matter of this disclosure, only a single work queue, i.e., admission queue is shown for simplicity; however, in addition to the admission queue 122, the group 120 may further comprise other queues, e.g., a de-scheduled queue, a conflicted queue. Role of such queues is disclosed in a co-pending application Ser. No. 14/170,955, filed on Feb. 3, 2014, by Wilson P. Snyder II, et al., entitled A METHOD AND AN APPARATUS FOR WORK PACKET QUEUING, SCHEDULING, AND ORDERING WITH CONFLICT QUEUING.

The admission queue 122 may comprise at least one entry comprising work, and, optionally, also a tag, and tag-type to enable scheduling of the work to one or more processor cores 114; thus allowing different work to be performed on different processor cores 114. By means of an example, packet processing can be pipelined from one processor core to another, by defining the groups from which a processor core 114 will accept work.

A tag is used by the SSO unit 116 to order and synchronize the scheduled work, according to the tag and a tag-type selected by the processor core 114. The tag allows work for the same flow (from a source to a destination) to be ordered and synchronized. The tag-type selects how the work is synchronized and ordered. There are three different tag-types. Ordered, i.e., work ordering is guaranteed, however, atomicity is not. Such a tag-type may be used during a de-fragmentation phase of packet processing, so that fragments for the same packet flow are ordered. Atomic i.e., work ordering and atomicity are guaranteed, in other words, when two work items have the same tag, the work must be processed in order, with the earlier work finishing before the later work can begin. Such a tag-type may be used for IPSec processing to provide synchronization between packets that use the same IPSec tunnel. Thus, IPSec decryption is carried out with atomic tag-type. Untagged, i.e., work ordering among the processor cores is not guaranteed, and the tag is not relevant with this tag-type. Such a tag may be used for processing different packet flows, which will likely have different tag, so will likely not be ordered and synchronized relative to each other, and can be executed completely in parallel on different processor cores 114.

Work queue entry may be created by hardware units, e.g., the packet input unit 106, in the memory 112. The add work request may then be submitted to the SSO unit 116 via an add-work entity 118. Alternatively, work queue entry may be created and add work request may be submitted by a software entity running at a processor core 114. In an aspect, work queue entry is created and add work request is submitted via the add-work entity 118 upon each packet arrival. In other aspects, work queue entry may be created upon completion of sending a packet, completion of compressing/decompressing data from a packet, and/or other events known to person of ordinary skills in the art.

Upon receiving the add work request, the SSO unit 116 adds the work, the tag, and the tag-type associated with the work into an admission queue 122 corresponding to the group 120 indicated by the add work request. In an aspect, the admission queue 122 may overflow to the cache 108 and/or the memory 112.

Software entity executing on processor core 114, or the processor core 114 itself may request work from the SSO unit 116 via work-slots 142. Work-slot 142 comprises a memory. As disclosed supra, the work request indicates one or more groups associated with the processor cores 114; consequently, only those groups need to be arbitrated among. In response to the request, a get-work arbiter 134 arbitrates among the groups 120, associated with the requesting processor core 114, which have work in one of the admission queues 122, evaluates tags of the work at the top of the admission queue 122, selects one of the admission queues 122, and provides the work into the work-slot 142 corresponding to the requesting processor core 114 as disclosed in detail infra. Additionally, the get-work arbiter 134 provides the tag, and tag-type associated with the work to a memory, which is a part of a tag-chain manager interfacing the memory with other elements of the network processor 100. Any type of memory known to a person skilled in the art is contemplated. In an aspect, the memory comprises a Content Addressable Memory (CAM). The tag-chain manager 140 thus assists the SSO unit 116, to account for work that cannot be processed in parallel due to ordered or atomic requirements by keeping track of tags corresponding to the work being provided into the work-slot 142; therefore, knowing what work each processor core 114 is acting upon.

Reference is now made to FIG. 2, depicting a conceptual structure of groups 120 and admission queues 122 from FIG. 1 in greater detail.

To support an arbitration process among the admission queues 222 within the groups 220, each group 220 and admission queue 222 is associated with a plurality of parameters characterizing the queue and/or the group. A person skilled in the art will understand that a different implementation may comprise a parameters different form the parameters disclosed infra. Initially, the parameters are set during initialization of the network processor 100, in accordance, with, e.g., the user knowing the relative Quality of Service for each of the groups 220.

A group priority 224 is a parameter determining priority of a group relative to other groups.

A group weight 226 is a parameter determining weight for a group relative to other groups. The parameter is used to determine a relative selection ratios between groups 220 having the same priority. By means of an example, consider the group 220_1 having a weight equal to 2, and the group 2202 having a weight equal to 1. The group 220_1 will be selected ⅔ of the arbitrations, the group 220_2 will be selected ⅓ of the arbitrations.

A group weight_left 228 is a parameter indicating the remaining weight for the group. The value of group weight_left is initialized to the value of weight.

An group affinity 230 is a parameter determining number of works that may be provided to the same processor core. Because work belonging to the same group is more likely to share work-queue entry comprising data and/or instructions than a different group, a high affinity value increases cache locality and throughput. This is due to the fact that cache containing the work-queue entry is more likely to be selected again when work from the same group lands in the same work-slot, and, therefore, the same processor's cache. Consequently, the processor core will need fewer accesses from the non-cached storage. A low affinity decreases locality, but also decreases latency. Software may thus select an affinity to balance throughput versus latency. As used in the art, the term locality describes the same value, or related storage locations, being frequently accessed.

The parameters are held in a memory structures, e.g., registers. A processor register is a small amount of storage available as part of a CPU or other digital processor. Such registers are (typically) addressed by mechanisms other than main memory and can be accessed more quickly. Almost all computers, load-store architecture or not, load data from a larger memory into registers where it is used for arithmetic, manipulated, or tested, by some machine instruction.

To support an arbitration process among the groups 220, each SSO unit comprises at least one work-slot structure 236 comprising a configuration information for an associated work-slot 242. In an aspect, each processor core 214 has at least one associated work-slot 242 and at least one associated work-slot structure 236 and selects which work-slot 242 and which work-slot structure 236 is to be used when requesting work. Because the number of the work-slot structures 236 and work-slots 242 is irrelevant for the subject-matter of this disclosure, only a single work-slot structure 236 and work-slot 242 per a processor core is shown to avoid unnecessary complexity. In an aspect, the work-slot structure 236 comprises a memory comprising a plurality of registers, each register storing a different configuration parameter.

A configuration information parameter may comprise a mask 236_2 that determines the at least one group 220 that may be serviced by an associated work-slot 242. In an aspect, the mask may comprise a plurality of bits, wherein each of the plurality of bits is associated with one of the groups 220. A first value of the bit enables the associated group 220 to be serviced by the work-slot 242, a second value of the bit disables the associated group 220 to be serviced by the work-slot 242.

Another configuration information parameter may comprise last_group 236_4 that indicates the last_group from which the work-slot 242 received work.

Yet another configuration information parameter may comprise affinity_left 236_6 that indicates the remaining cache locality and throughput for the work-slot 242. The value of affinity_left is initialized to the value of affinity.

Yet another configuration information parameter may comprise a pseudo-random number generator, random-number generator, or other source of entropy 238 known to a person of ordinary skills in the art. The source of entropy 238 is used in case that arbitration among a plurality of bidding groups 220 with equal credential as determined by the group arbitration parameters needs to be made.

Figure 3A:
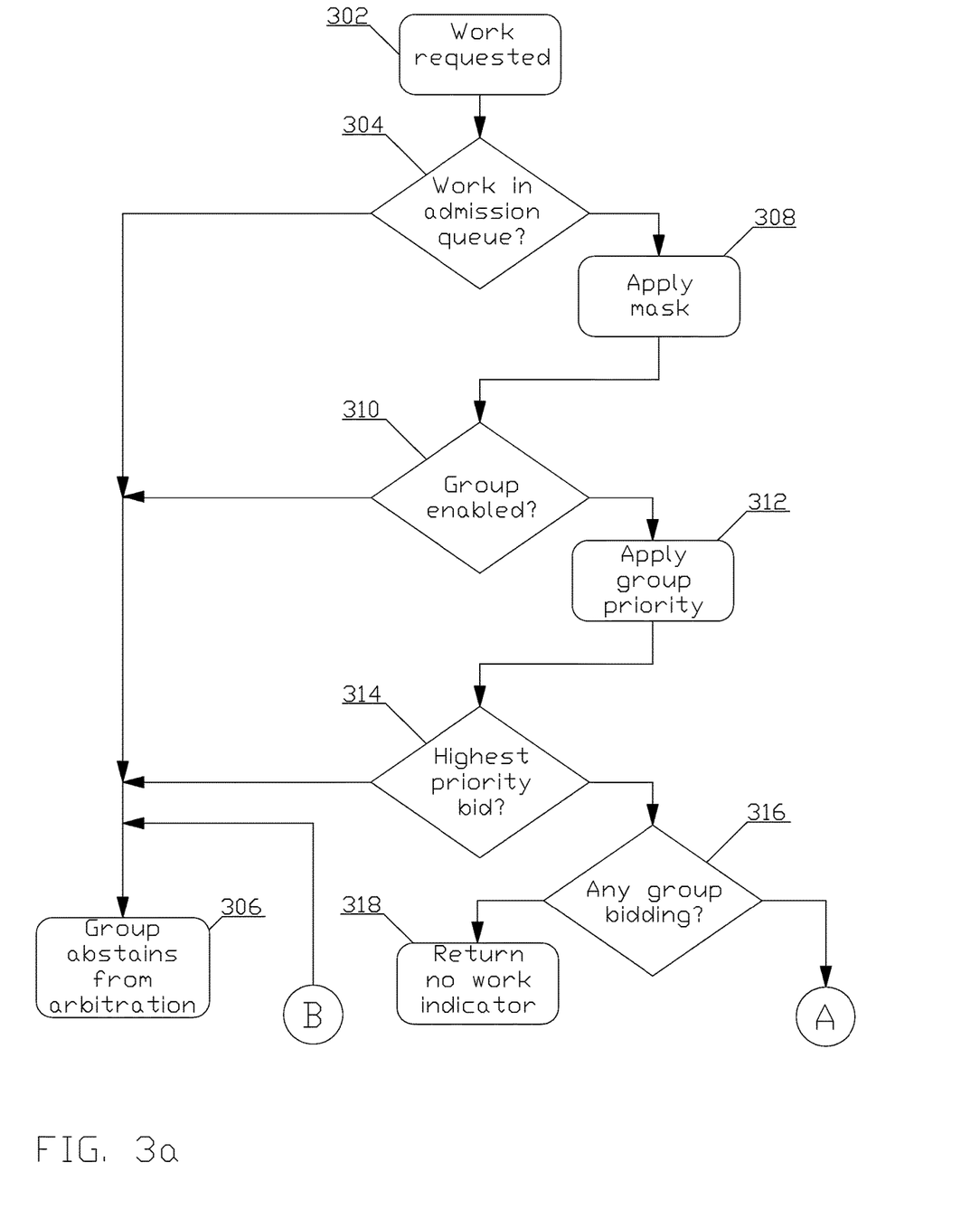
FIG. 3a depicts a first part of a flow chart enabling a process of work request arbitration in a network processor in accordance with an aspect of this disclosure.
Figure 3B:
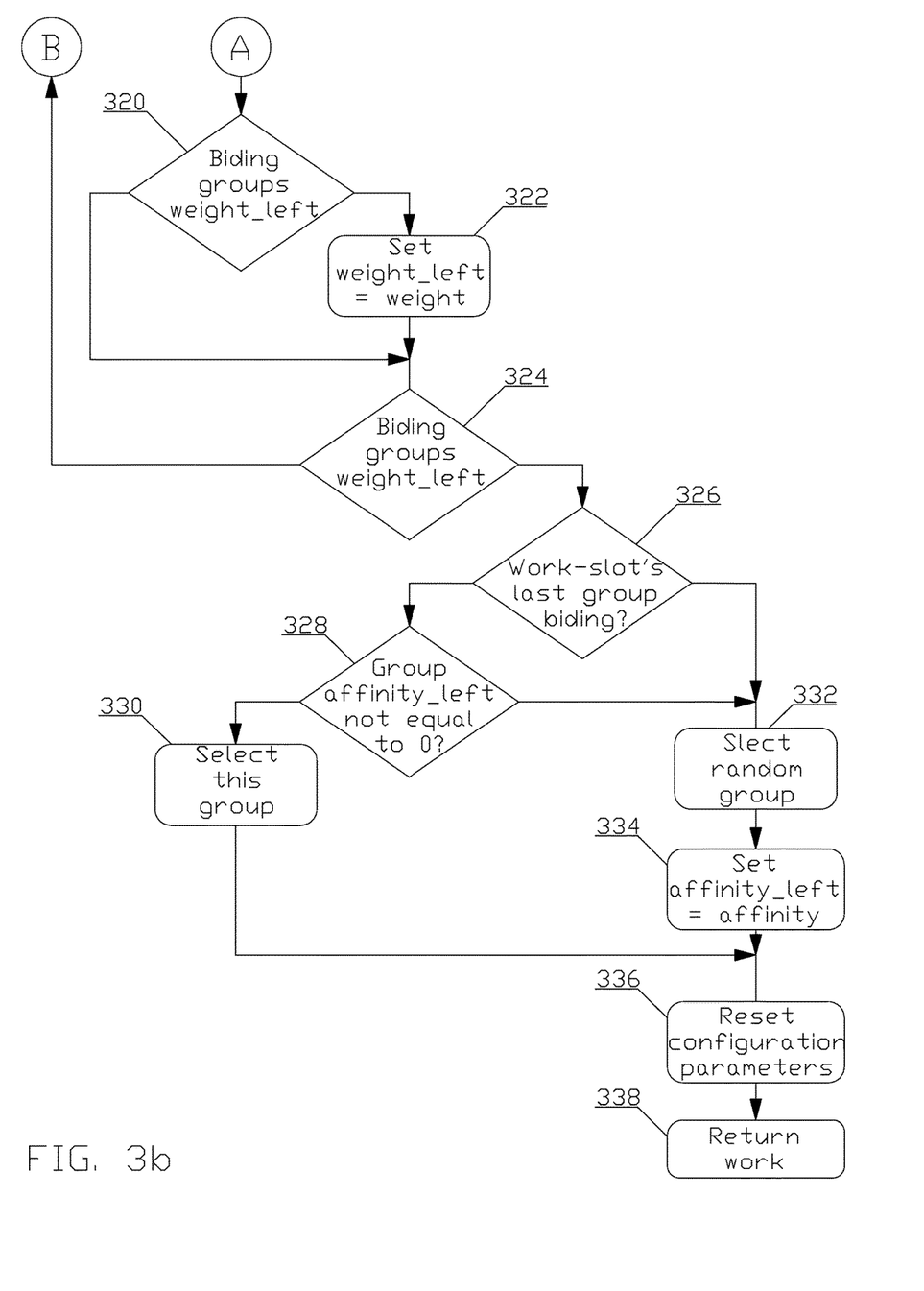
FIG. 3b depicts a second part of the flow chart enabling the process of work request arbitration in the network processor in accordance with the aspect of this disclosure.

Reference is now made to FIG. 3, depicting a flow chart enabling the process of work request arbitration in a network processor in accordance with an aspect of this disclosure. To clarify the relationship between certain elements of a conceptual structure and information flow among the elements of the structure depicted in FIG. 1 and FIG. 2 in the FIG. 3 description, the references to elements of FIG. 1 and FIG. 2 are in parenthesis.

In step 302, a software entity executing on one of the processor cores (114) is ready to obtain work to process. The software entity executing on, e.g., the processor core (114_1), or the processor core (114_1) itself issues a GET_WORK requesting work from the SSO unit (116) via the associated work-slot (142_1, 242_1). Although both the software entity and the processor core may be the requestor, in order to avoid unnecessary repetitiveness, in the reminder of the disclosure only the software entity is recited. As disclosed supra, the work request indicates one or more groups associated with the processor core (114_1); consequently, only those groups need to be arbitrated among. In an aspect, the GET_WORK request is initiated by a load instruction to an input/output (I/O) address. In another aspect, the GET_WORK request is initiated by a store instruction and returned into a memory location specified by the processor core (114_1). The process continues in step 304.

In step 304, in response to the request, a get-work arbiter (134, 234) determines which of the one or more groups (120, 220) that are associated with the processor core (114_1) have work in an admission queue (122, 222) and may thus bid, i.e., be eligible to participate in the arbitration process. The arbitration process results in selecting work from one of the groups (120, 220) that will be provided to the work-slot (142_1, 242_1). The work-slot (142_1, 242_1) notifies the software entity executing on the processor core (114_1) that work is available. In one aspect, the this notification is the return of processor requested I/O read data. The processing of non-bidding group(s) continues in step 306; the processing of bidding groups continues in step 308.

In step 306, the groups abstain from the arbitration process until a new arbitration process starts.

In step 308, the get-work arbiter (134, 234) applies mask (236_2) to each of the bidding groups (120, 220). The processing continues in step 310.

In step 310, the get-work arbiter (134, 234) determines for each bit in the mask (236_2) whether a value of the bit disables the associated group (120, 220) to be serviced by the work-slot (142_1, 242_1). Processing of disabled groups continues in step 306; the processing of enabled, i.e., bidding groups continues in step 312.

In step 312, get-work arbiter (134, 234) applies group priority to each of the bidding groups (120, 220). The processing continues in step 314.

In step 314, the get-work arbiter (134, 234) determines for each bidding group (120, 220), whether the group has a priority equal to the highest priority of any bidding groups (120, 220), in other words, whether the tested group has the highest bidding priority. Processing of groups with the highest priority continues in step 306; the processing of the other groups continues in step 316.

In step 316, the get-work arbiter (134, 234) determines whether any group (120, 220) is still bidding. When no group (120, 220) is bidding, the processing continues in step 318; otherwise, the processing continues in step 320.

In step 318, the get-work arbiter (134, 234) returns an indication that no work is available to the requesting processor core (114_1). In response, the processor core (114_1) may enter a enter a low power mode, carry-out non-work related processing, or issue another GET_WORK request as disclosed in step 302

In step 320, the get-work arbiter (134, 234) determines a value of group weight_left (230) for all groups (120, 220) still bidding. If all bidding groups (120, 220) have the value of weight_left (230) equal to zero, processing continues in step 322; otherwise the processing of all bidding groups (120, 220) continues in step 324.

In step 322, the get-work arbiter (134, 234) sets the value of group weight_left (230) equal to the value of weight (228) for each of the groups (120, 220) still bidding. This step is necessary to enable the groups to be serviced because with the value of group weight_left equal to zero, the group would never be serviced again. Consider the example supra, with group (120_1, 220_1) having weight equal to two and group (120_2, 220_2) having weight equal to one. When the decision between group (120_1, 220_1) and group (120_2, 220_2) is to be made, group (120_1, 220_1) is selected because it has a higher weight. As disclosed in step 336 infra, after a group is selected, the selected group's weight_left is decremented by one. Thus, the groups' (120_1, 220_1), (120_2, 220_2) group weight_left would eventually decrease to zero and no group would be serviced. The processing continues in step 324.

In step 324, the get-work arbiter (134, 234) determines the value of group weight_left (230) of all groups (120, 220) still bidding. Processing of groups (120, 220) with the value of group weight_left (230) equal to zero continues in step 306; the processing of the other groups (120, 220) continues in step 326. Due to processing in steps 320, 322, at least one group (120, 220) must have a value of group weight_left non-zero and thus enter step 326.

In step 326, the get-work arbiter (134, 234) determines whether the last_group (120, 220) that that was selected last time to provide work to the work-slot (142_1, 242_1) that requested the work is still biding. When the determination is affirmative, the processing continues in step 328: otherwise, the processing continues in step 330.

In step 328, the get-work arbiter (134, 234) determines the value of affinity_left (330) for the group (120, 220) that was selected last time to provide work to the work-slot (142_1, 242_1). When the value of affinity_left (230) is not equal to zero, the processing continues in step 330; otherwise, the processing continues in step 332.

In step 330, the get-work arbiter (134, 234) selects the group (120, 120) that was selected last time to provide work to the work-slot (142_1, 242_1). This means that work from the same group will be provided to the same work-slot multiple times, which aids cache performance because the cache is more likely to be selected again when work from the same group lands in the same work-slot, and, therefore, the same processor's cache. Since as discussed supra, the cache is more likely to contain data that is needed again and thus the processor core will need fewer accesses from the non-cached storage. The processing continues in step 336.

In step 332, in an aspect when only one bidding group (120, 220) is remaining, get-work arbiter (134, 234) selects the group. Otherwise, the source of entropy (238) generates a number that is used to select one group (120, 220) from the plurality of remaining bidding groups (120, 220). In an aspect, the selection is carried out by using the first bidding group starting at the generated number. By means of an example, consider that out of four groups, two groups, e.g., the first group and the fourth group, are still bidding. If the generated number equals two, the second group is not bidding, therefore, the next group is tested. The generated number is increased, or alternatively decreased, and the next group is tested. The process continues, until a group still bidding is found. The processing continues in step 334.

In step 334, get-work arbiter (134, 234) sets the value of the work-slot's (236) affinity_left (236_6) to the value of the group's (120, 220) affinity (230_2). The processing continues in step 336.

In step 336, get-work arbiter (134, 234) resets configuration parameters; namely, the value of the work-slot's (236) parameter the last_group (236_4) is set to the value identifying the group that was selected to provide the work; the value of the work-slot's (236) parameter affinity_left (2366), unless equal to zero is decreased by one to prevent the same last_group to be continuously selected; the selected group's (120, 220) parameter group weight_left (220_6), unless equal to zero is decreased by one for the reasons disclosed supra. The processing continues in step 338.

In step 338, the get-work arbiter (134, 234) provides work form the selected group (120, 220).

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation. Furthermore, the sequence of the steps may be re-arranged as long as the re-arrangement does not result in functional difference. By means of an example, the sequence of the steps 204 and 210 may be exchanged.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for work request arbitration, comprising:
   receiving a work request from a requestor at an associated work-slot, the work request indicating one or more groups from a plurality of groups;
   determining at least one of a plurality of parameters in accordance with the received work request;
   determining eligibility to provide work among the one or more groups that have work in a work queue in accordance with a first set of the at least one of the plurality of parameters; and
   selecting one of the determined eligible groups to provide the work to the associated work slot in accordance with a second set of the at least one of the plurality of parameters.

2. The method as claimed in claim 1, wherein the determining at least one of a plurality of parameters in accordance with the received work request, comprises:
   determining a work-slot structure in accordance with the work request, the work-slot structure comprising the at least one of the plurality of parameters.

3. The method as claimed in claim 1, wherein the least one of the plurality of parameters comprises:
   a mask;
   a last_group; and
   an affinity_left.

4. The method as claimed in claim 1, wherein the determining eligibility to provide work among the one or more groups that have work in a work queue in accordance with a first set of the at least one of the plurality of parameters, comprises:
   determining eligibility to provide work among the one or more groups that have work in the work queue in accordance with a mask, a group priority, and a group weight_left.

5. The method as claimed in claim 4, wherein the group priority, and the group weight_left are specific for each group.

6. The method as claimed in claim 4, wherein the determining eligibility to provide work among the one or more groups that have work in the work queue in accordance with a mask, a group priority, and a group weight_left comprises:
   determining as eligible at least one of the one or more groups that have work in the work queue that are enabled by the mask, have the highest group priority, and have non-zero value of the group weight_left.

7. The method as claimed in claim 1, wherein the selecting one of the determined eligible groups to provide the work in accordance with a second set of the at least one of the plurality of parameters, comprises:
   determining whether an eligible group that was selected last time to provide work is eligible and the group's affinity_left parameter is not equal to zero; and
   selecting the eligible group when the determining is affirmative.

8. The method as claimed in claim 1, wherein the selecting one of the determined eligible groups to provide the work in accordance with a second set of the at least one of the plurality of parameters, comprises:
   determining whether an eligible group that was selected last time to provide work is eligible and the group's affinity_left parameter is not equal to zero; and
   selecting randomly one of the eligible groups when the determining is negative.

9. The method as claimed in claim 8, wherein the selecting randomly one of the one or more eligible groups, comprises:
   generating an entropy; and
   selecting randomly one of the eligible groups in accordance with the generated entropy.

10. The method as claimed in claim 9, wherein the selecting randomly one of the eligible groups in accordance with the generated entropy, comprises:
    selecting the first eligible group starting at the generated entropy.

11. The method as claimed in claim 1, further comprising:
    setting the value of a parameter last_group equal to value of a parameter group; decrementing the value of a parameter affinity_left by one; and
    decrementing the value of a parameter group weight_left by one.

12. An apparatus for work request arbitration, comprising:
    at least one work-slot configured to receive a work request from an associated requestor, the work request indicating one or more groups from a plurality of groups; and
    a get-work arbiter configured to:
       determine at least one of a plurality of parameters in accordance with the received work request;
       determine eligibility to provide work among the one or more groups that have work in a work queue in accordance with a first set of the at least one of the plurality of parameters; and select one of the determined eligible groups to provide the work into the one work-slot in accordance with a second set of the at least one of the plurality of parameters.

13. The apparatus as claimed in claim 12, wherein the get-work arbiter determines at least one of a plurality of parameters in accordance with the received work request by being configured to:

determine a work-slot structure selected by the requestor in accordance with the work request, the work-slot structure comprising the at least one of the plurality of parameters.

14. The apparatus as claimed in claim 12, wherein the least one of the plurality of parameters comprises:

a mask;

a last_group; and an affinity_left.

15. The apparatus as claimed in claim 12, wherein the get-work arbiter determines eligibility to provide work among the one or more groups that have work in a work queue in accordance with a first set of the at least one of the plurality of parameters by being configured to:

determine eligibility to provide work among the one or more groups that have work in a work queue in accordance with a mask, a group priority, and a group weight_left.

16. The apparatus as claimed in claim 15, wherein the group priority, and the group weight_left are specific for each group.

17. The apparatus as claimed in claim 15, wherein the get-work arbiter determines eligibility to provide work among the one or more groups that have work in the work queue in accordance with a mask, a group priority, and a group weight_left by being configured to:

determine as eligible at least one of the one or more groups that have work in the work queue that are enabled by the mask, have the highest group priority, and have non-zero value of the group weight_left.

18. The apparatus as claimed in claim 12, wherein the get-work arbiter selects one of the determined eligible groups to provide the work in accordance with a second set of the at least one of the plurality of parameters by being configured to:

determine whether an eligible group that was selected last time to provide work is eligible and the group's affinity_left parameter is not equal to zero; and select the eligible group when the determining is affirmative.

19. The apparatus as claimed in claim 12, wherein the get-work arbiter select one of the determined eligible groups to provide the work in accordance with a second set of the of the at least one plurality of parameters by being configured to:

determine whether an eligible group was selected last time to provide work is eligible and the group's affinity_left parameter is not equal to zero; and select randomly one of the eligible groups the determination is negative.

20. The apparatus as claimed in claim 19, further comprising:

a generator configured to generate an entropy; and wherein the get-work arbiter is configured to select randomly one of the eligible groups in accordance with the generated entropy.

21. The apparatus as claimed in claim 20, wherein the get-work arbiter selects randomly one of the eligible groups in accordance with the generated entropy by being configured to:

select the first eligible group starting at the generated entropy.

22. The apparatus as claimed in claim 12, wherein the get-work arbiter is further configured to:

set the value of a parameter last_group equal to value of a parameter group;

decrement the value of a parameter affinity_left by one; and decrement the value of a parameter group weight_left by one.

\* \* \* \* \*